US012540014B2

(12) United States Patent
Hamadene et al.

(10) Patent No.: US 12,540,014 B2
(45) Date of Patent: Feb. 3, 2026

(54) SCORED LOCKING CAP FOR NECK CONTAINER

(71) Applicant: A. Raymond et cie, Grenoble (FR)

(72) Inventors: Sofien Hamadene, Saint Etienne de Crossey (FR); Stéphanie Pellet, Sassenage (FR)

(73) Assignee: A. RAYMOND ET CIE, Grenoble (FR)

( * ) Notice: Subject to any disclaimer, the term of this patent is extended or adjusted under 35 U.S.C. 154(b) by 195 days.

(21) Appl. No.: 18/390,265

(22) Filed: Dec. 20, 2023

(65) Prior Publication Data

US 2024/0208697 A1 Jun. 27, 2024

(30) Foreign Application Priority Data

Dec. 22, 2022 (FR) ...................................... 2214266

(51) Int. Cl.

| | |
|---|---|
| ***B65D 41/58*** | (2006.01) |
| ***A61J 1/14*** | (2023.01) |
| ***B65D 51/00*** | (2006.01) |

(52) U.S. Cl.

CPC ............ *B65D 41/58* (2013.01); *A61J 1/1412* (2013.01); *B65D 51/002* (2013.01); *B65D 2401/20* (2020.05); *B65D 2401/25* (2020.05)

(58) Field of Classification Search

CPC .. B65D 41/58; B65D 51/002; B65D 2401/20; B65D 2401/25; B65D 2401/35; B65D 51/241; B65D 45/30; B65D 41/28; B65D 85/00; B65D 41/3423; B65D 51/18; A61J 1/1412

See application file for complete search history.

(56) References Cited

U.S. PATENT DOCUMENTS

| | | | | |
|---|---|---|---|---|
| 9,382,044 | B2 * | 7/2016 | Chanas .................. | B65D 41/48 |
| 2021/0009320 | A1 | 1/2021 | Clavel | |

FOREIGN PATENT DOCUMENTS

| | | |
|---|---|---|
| EP | 2814752 | 4/2016 |
| EP | 3763635 | 9/2021 |

OTHER PUBLICATIONS

French Search Report for Application No. 2214266 dated Jul. 4, 2023, 2 pages.

* cited by examiner

*Primary Examiner* — James N Smalley
(74) *Attorney, Agent, or Firm* — TraskBritt

(57) ABSTRACT

A locking cap for a container comprising a neck comprises: —an outer body, defined by an upper face and a cylindrical wall, and including a breakable strip extending from the upper face to a free end of the cylindrical wall, —a capsule, arranged on the upper face and rigidly connected to the breakable strip, —a cage, locked in the outer body, having a generally cylindrical shape, and comprising a plurality of bridges connecting neighboring branches, and a flexible member, one end of which is rigidly connected to a bridge and another free end of which is oriented upward, the flexible member being adjacent to a weak point of the bridge. The flexible member of the cage is rigidly connected to the breakable strip of the outer body.

20 Claims, 5 Drawing Sheets

SCORED LOCKING CAP FOR NECK CONTAINER

PRIORITY CLAIM

This application claims the benefit of the filing date of French Patent Application Serial No. FR2214266, filed Dec. 22, 2022, for "BREAKABLE LOCKING CAP FOR A CONTAINER COMPRISING A NECK," the disclosure of which is incorporated herein in its entirety by this reference.

TECHNICAL FIELD

The present disclosure relates to a cap for a container comprising a neck, intended to block a stopper in the neck of the container. The present disclosure relates, in particular, to a locking cap suitable for bottles, for example, for pharmaceutical products, requiring the cap, then the stopper to be completely removed in order to extract or reconstitute the product.

BACKGROUND

EP2814752 is known, which proposes a completely removable device for locking a stopper to a container comprising a neck. This device comprises an outer ring shaped to cover the stopper and surround the upper collar of the neck of the container. It also comprises an annular inner ring, which is capable of being rigidly connected in the outer ring and is provided with lower internal notches, which are intended to bear under the collar in order to be attached to the container. Such a cap makes it possible to lock a stopper in the neck of the container and thus to keep the container hermetically sealed.

These locking devices are ordinarily used to store pharmaceutical products in containers such as bottles. Some products are withdrawn using a syringe, which is inserted through the elastomer stopper, after removal of a protective capsule in the upper part of the locking device. Other products require the bottle to be completely opened in order to be extracted therefrom or reconstituted.

Addressing this last scenario, the above-mentioned document provides a frangible zone, in the region of the outer ring of the locking device, which is capable of being broken to allow the ring to be opened and withdrawn relative to the collar of the bottle. The inner ring is in turn provided with a deformable and breakable bridge, which is capable of being broken to allow the ring to be withdrawn, thus allowing access to the stopper and allowing it to be withdrawn from the neck of the container.

A drawback of this solution comes from the lack of repeatability and ergonomics of the opening, linked to the difficulty of pulling in a repeatable manner on the inner ring until the deformable and breakable bridge breaks.

Document EP3763635 addresses this problem at least in part by implementing a locking cap provided with an outer body having a breakable part and a cage configured to engage and lock axially in the outer body, and also adapted to surround the collar of the neck of the container in a locked position of the cap. The cage comprises a breakable zone and a flexible opening tab, adjacent to the breakable zone; applying a tension force on the tab allows breaking to be caused reproducibly at the breakable zone.

However, it is sometimes difficult to grip and hold a thin opening tab, in particular, when gloves are worn (which is typically the case for the personnel performing the opening of the bottle in order to use the product contained in the bottle). There is therefore a need to simplify and improve the ergonomics of the complete opening of the locking cap of a bottle for a pharmaceutical product.

BRIEF SUMMARY

The present disclosure proposes a solution which aims to remedy all or some of the drawbacks of the prior art. The disclosure relates to a locking cap allowing an ergonomic, secure and repeatable removal of the cap, so as to allow the extraction of the elastomer stopper and access to the contents of the container.

The present disclosure relates to a locking cap for a container comprising a neck, intended to block a stopper in the neck of the container and comprising:

- an outer body, defined by an upper face and a cylindrical wall centered on a main axis, the outer body having a breakable strip extending from the upper face to a free end of the cylindrical wall,
- a capsule, arranged on the upper face and rigidly connected to the breakable strip, and
- a cage locked in the outer body, and intended to surround a collar of the neck of the container in a locking position of the cap; the cage comprising an upper ring, against which the stopper is intended to bear when it is arranged in the cage, a plurality of branches connected to the upper ring and defining therewith a generally cylindrical shape of the cage, a plurality of bridges, each interconnecting two adjacent branches, and a flexible member, one end of which is rigidly connected to a bridge and another free end of which is oriented toward the upper ring, the flexible member being adjacent to a weak point of the bridge.

According to other advantageous non-limiting features of the present disclosure, taken alone or according to any technically feasible combination:

- the weak point corresponds to a notch or a slot arranged on the bridge supporting the flexible member;
- the capsule is rigidly connected to the breakable strip at a first fixing zone,
- the flexible member is rigidly connected to the breakable strip at a second fixing zone,
- the first fixing zone and/or the second fixing zone is (are) formed by mechanical retaining means arranged on each element to be rigidly connected and cooperating with one another,
- the first fixing zone and/or the second fixing zone involve(s) chemical adhesion between the materials of the elements to be rigidly connected,
- the mechanical retaining means comprise a flange, a shoulder or a dovetail system,
- the second fixing zone is located, in height along the main axis, between the upper face of the outer body and half the height of the cylindrical wall of the outer body,
- the outer body is made from a first material and a second material, the first material forming the breakable strip and the second material forming the rest of the outer body, and the capsule is produced from the first material,
- the capsule is formed of polypropylene,
- the outer body is formed of one or more material(s) selected from polypropylene and polybutylene terephthalate,
- the cage is made of polycarbonate.

The present disclosure also relates to a method for manufacturing a locking cap as above, comprising at least one overmolding step for molding and rigidly connecting together:

the capsule and the outer body, and the outer body and the cage.

BRIEF DESCRIPTION OF THE DRAWINGS

Other features and advantages of the present disclosure will emerge from the following detailed description of example embodiments of the present disclosure with reference to the accompanying figures, wherein.

In the description, the same references in the figures may be used for elements of the same type.

DETAILED DESCRIPTION

Figure 1A:
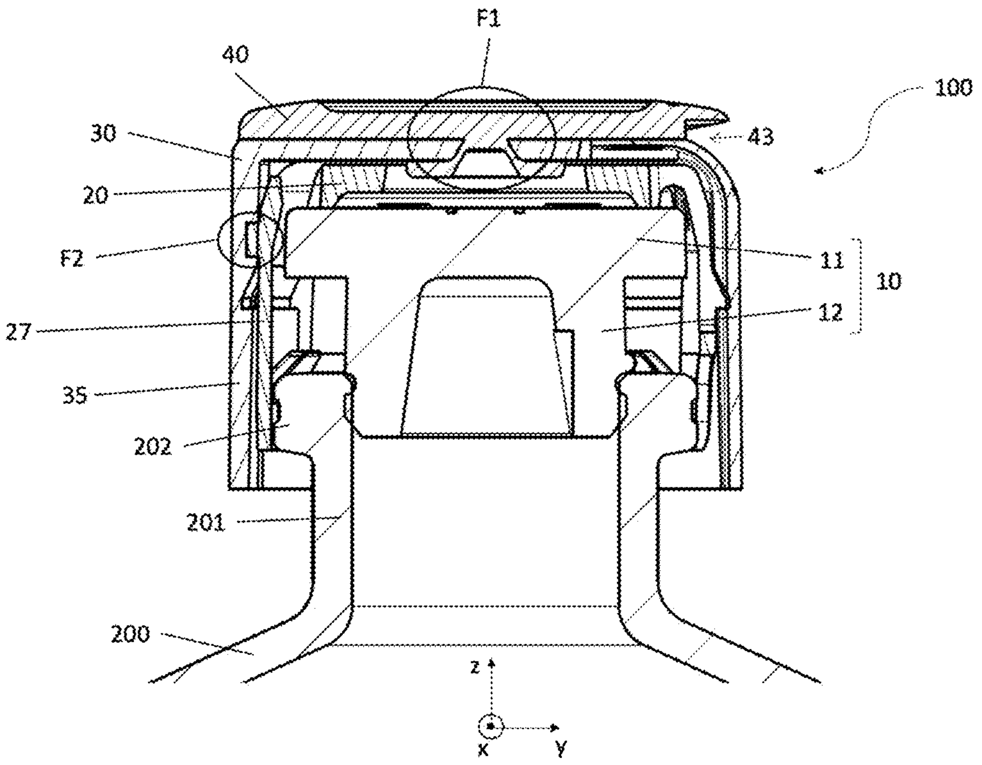
FIGS. 1A and 1B show cross-sectional views of a container comprising a neck with, respectively: (a) a stopper partially pushed into the neck and a locking cap according to the present disclosure, in the intermediate holding position, and (b) a stopper pushed into the neck and a locking cap according to the present disclosure, in the locking position.

The present disclosure relates to a locking cap 100 for a container 200 comprising a neck, intended to block a stopper 10 in the neck 201 of the container 200. The container 200 may, in particular, take the form of a bottle, comprising a neck 201 having a circular opening, which ends in a collar 202 that is flared relative to the external periphery of the neck 201 (FIG. 1A). In the field of pharmaceutical applications, there are standards in terms of the internal diameter of the neck 201 of the container 200: 13 mm and 20 mm are examples of this.

The stopper 10 has a circular cross-sectional shape, and a T-shape having a head 11 and a foot 12, the head 11 having a diameter that is greater than the foot 12. Therefore, when the foot 12 of the stopper 10 is fully pressed into the neck 201, the head 11 is blocked against the collar 202.

It should be noted that, when the contents of the bottle are intended to be lyophilized, the stopper 10 has an opening in its foot 12 to allow the passage of evaporative flows as long as the foot 12 of the stopper 10 is not completely pressed into the neck 201.

The locking cap 100, when connected to the stopper 10, is capable of adopting two positions on the container 200: a first position, referred to as an intermediate holding position, wherein the stopper 10 is partially pressed into the neck 201 (FIG. 1A). It is in this position that the container 200 can be subjected to a lyophilization step, because the stopper 10 being partially pressed in allows the evaporative flows to pass through the opening made in the foot 12 of the stopper.

Figure 1B:
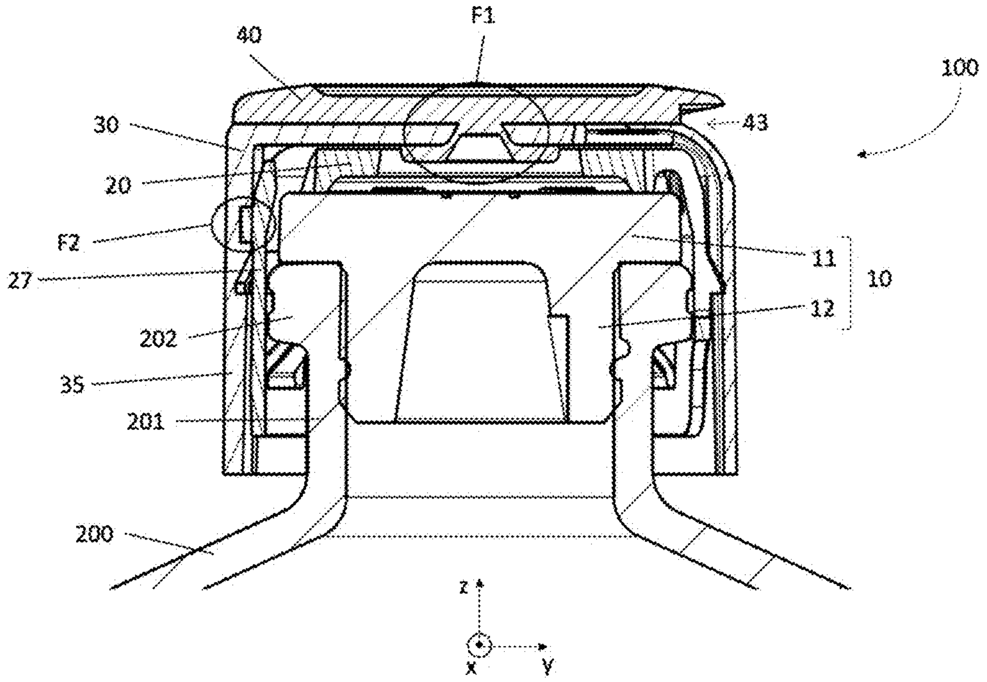

The cap 100 associated with the stopper 10 can also adopt a second position, referred to as the locking position, wherein the stopper 10 is fully pressed in and locked in the neck 201 by the cap 100 (FIG. 1B). In this position, the stopper 10 hermetically closes the container 200, the foot 12 being completely surrounded by the neck 201 of the container 200.

Figure 2A:
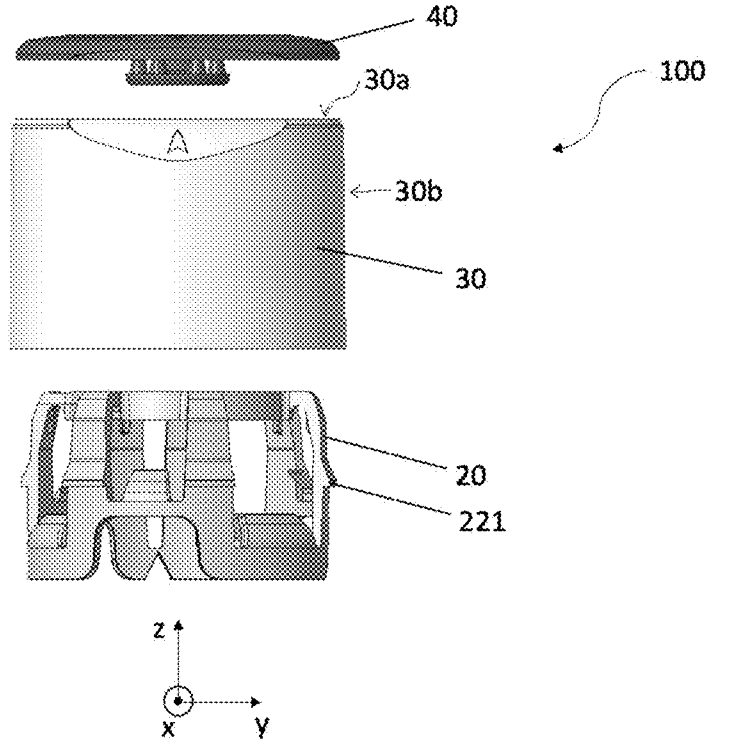
FIGS. 2A and 2B respectively show (a) an "exploded" view of the elements of a locking cap according to the present disclosure, and (b) a cross-sectional view of a locking cap according to the present disclosure with its rigidly connected elements (capsule, outer body and cage)
Figure 2B:
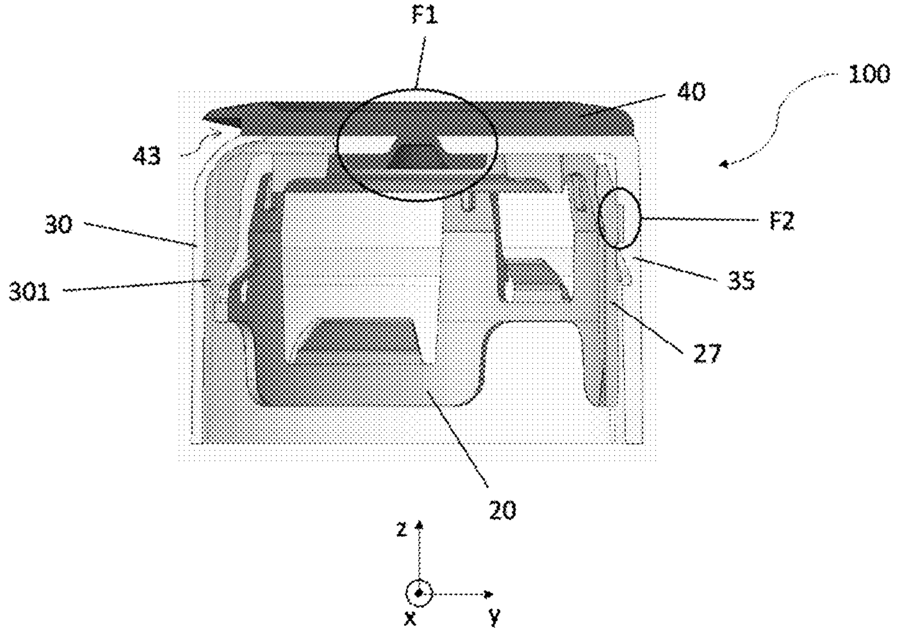

The locking cap 100 comprises a capsule 40, an outer body 30 and a cage 20 (FIG. 2A, FIG. 2B). The outer body 30 is configured to completely surround the cage 20, so as to prevent any access to the cage 20 from the outside, when the cap 100 locks the stopper 10 to the container 200.

The outer body 30 has a general cylindrical shape; it is defined by an upper face 30*a* and a cylindrical wall 30*b* centered on a main axis z. The free end of the cylindrical wall 30*b* defines an opening, adapted to accommodate the cage 20, and the stopper 10 before the positioning of the cap 100 on the neck of the container 200.

Figure 4A:
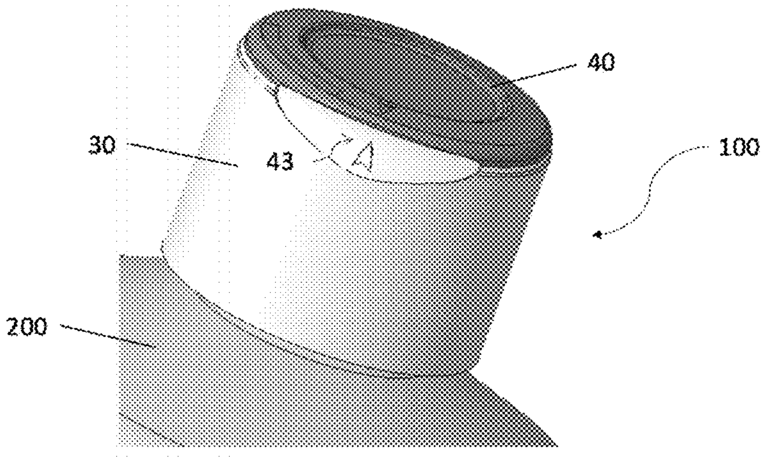
FIGS. 4A, 4B, 4C, 4D, and 4E show the steps of the separation process between a locking cap according to the present disclosure and the container whereupon it is locked.
Figure 4B:
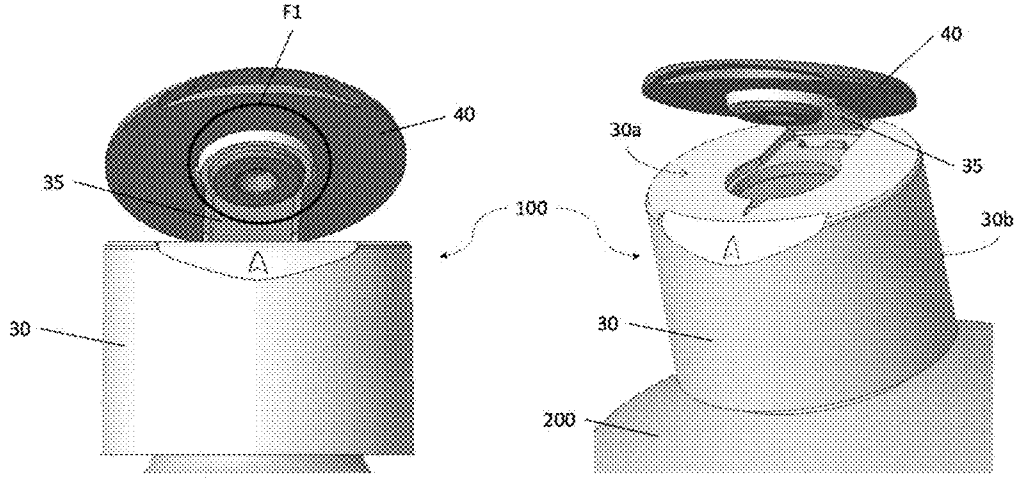
Figure 4C:
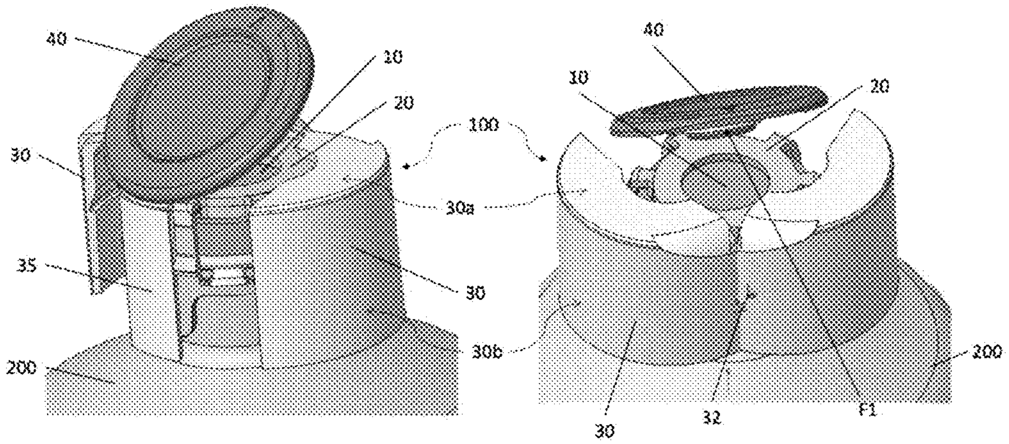

The outer body 30 has a breakable strip 35, visible in FIG. 4B and FIG. 4C. The breakable strip 35 extends from the upper face 30*a* to the free end of the cylindrical wall 30*b*. It may, for example, consist of a radial portion of the upper face 30*a*, continuing on a portion of the cylindrical wall 30*b*, the portions being delimited by a double groove at which the thickness of the outer body 30 is reduced.

The capsule 40 (FIG. 2A) is arranged on the upper face 30*a* of the outer body 30 and rigidly connected to the breakable strip 35 at a first fixing zone F1 (FIG. 1A, FIG. 1B, FIG. 2B).

In order to perform this attachment, the elements to be rigidly connected, namely the capsule 40 and the outer body 30, may comprise mechanical retaining means able to cooperate to form the first fixing zone F1. The mechanical retaining means may, in particular, consist of a flange or shoulder, a dovetail system, etc. (FIG. 2B). For example, the capsule 40 may comprise a tenon intended to pass through an orifice present on the upper face 30*a* of the outer body 30, and, in particular, in the portion belonging to the breakable strip 35. The capsule 40 and the outer body 30 can be attached to one another by heat stacking. It can also be obtained by forming the capsule 40 and the outer body 30 by an overmolding technique.

The first fixing zone F1 may involve chemical adhesion between the materials of the elements to be rigidly connected. For example, the capsule 40 and the outer body 30 can be formed by an overmolding technique, from the same or different plastic materials, but able to adhere to one another.

These two options (mechanical and chemical) for rigidly connecting the capsule 40 and the outer body 30 may of course be implemented together to form the first fixing zone F1.

Figure 3A:
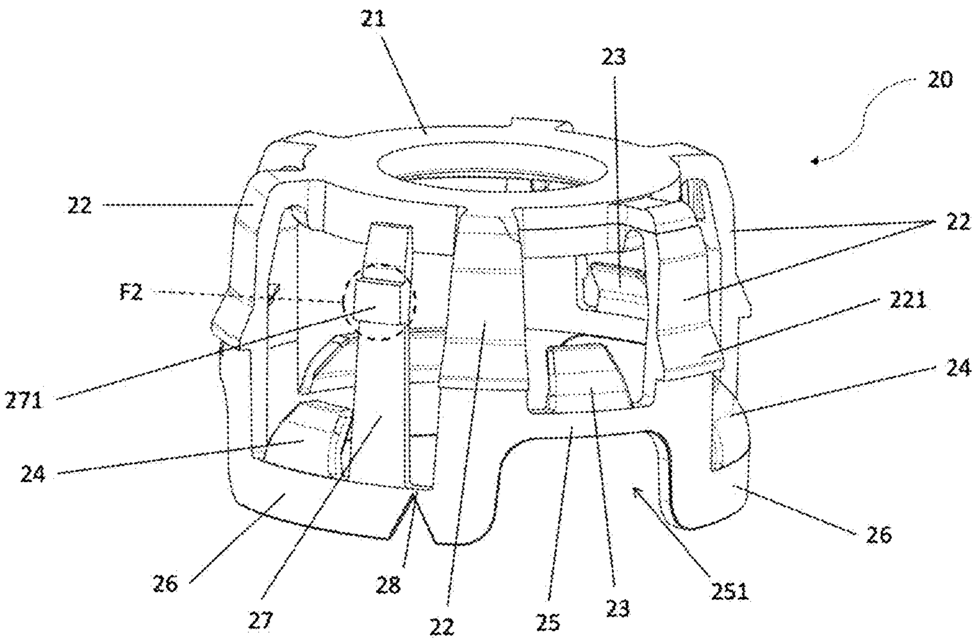
FIGS. 3A and 3B show perspective views of cages of a locking cap according to the present disclosure.
Figure 3B:
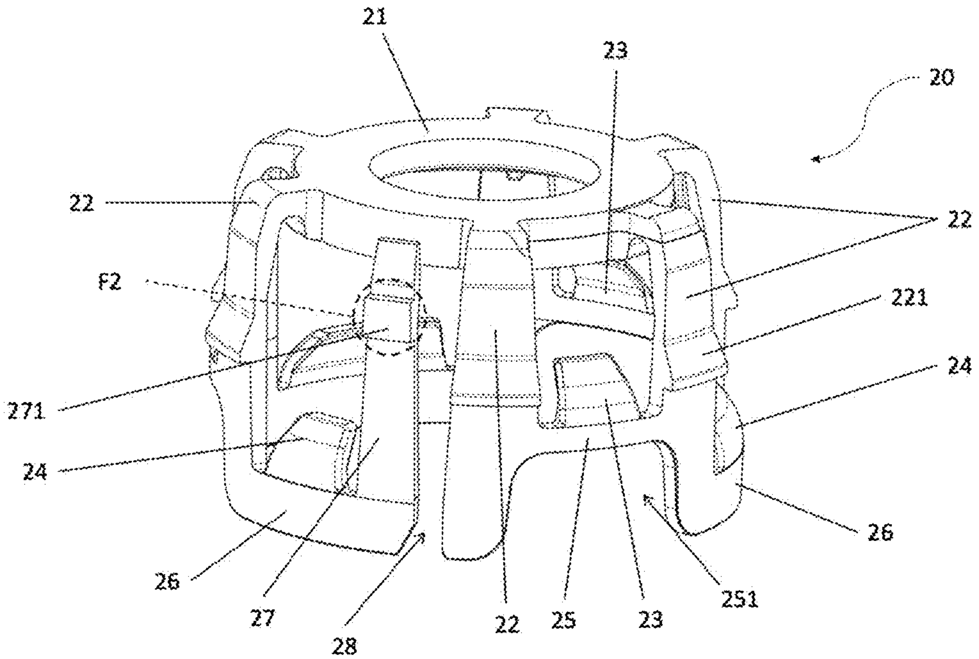

The cage 20 of the locking cap 100 comprises an upper ring 21 and a plurality of branches 22, which are connected to the upper ring 21 and define therewith a generally cylindrical shape of the cage 20, the central axis of which is the main axis z (FIG. 3A, FIG. 3B). When the cage 20 is locked inside the outer body 30, the upper ring 21 is pressed against an inner surface of the upper face 30*a*. The stopper 10 is intended to bear against the other side of the upper ring 21, as can be seen in FIG. 1A and FIG. 1B. The locking of the cage 20 in the outer body 30 is done, for example, by cooperation of lugs 221 in a complementary groove 301 provided in the inner wall of the outer body 30 (FIG. 2A, FIG. 2B).

The cage 20 also comprises a plurality of bridges 25, 26, each interconnecting two adjacent branches 22. In the examples shown in FIGS. 3A and 3B, the cage comprises six branches 22 and six bridges 25, but a different number could of course be implemented.

It should be noted that two types of bridges 25, 26 are preferentially present on the periphery of the cage 20: first bridges 25 are positioned at or reach an intermediate altitude between the upper ring 21 and the end of the branches 22; second bridges 26 connect the ends of adjacent branches 22 and are positioned at or reach an altitude lower than the aforementioned intermediate altitude (FIG. 3A, FIG. 3B). There is preferentially an alternation of first and second bridges (25, 26) on the periphery of the cage 20. Advantageously, the first bridges 25 occupy between 20% and 40% of the periphery of the cage 20, for example, 30%; the second bridges 26 occupy between 40% and 70% of the periphery, for example, 60%. The remaining periphery to reach 100% is occupied by the branches 22.

According to an embodiment that is particularly suitable for implementing lyophilization steps, each first bridge 25 is designed to provide an open space 251 between itself and the collar 202 when the cap 100 is in its intermediate holding position (FIG. 3B). The cage 20 thus has open spaces 251, which are distributed over the periphery of the cage 20, allowing the evaporative flows to be efficiently evacuated during lyophilization steps.

The first bridges 25 may alternatively be provided without the open space 251 (therefore being solid up to the free end of the branches 22) or provided with a much more restricted space, not used for discharging gas flows but useful, for example, for mechanical reasons or for reasons related to the design of the part or for gripping.

Preferably, the cage 20 comprises a plurality of first tabs 23, each being supported by a first bridge 25. Each first tab 23 is flexible and is inclined relative to the branches 22 toward the inside of the cage 20, at an angle of between 20° and 60°, advantageously around 45°, in the direction of the upper ring 21. These first tabs 23 are intended to block the stopper 10 inside the cage 20, against the upper ring 21, when the stopper 10 is connected to the cap 100. The first tabs 23 flex to allow the head 11 of the stopper 10 to pass when the stopper is introduced into the cage 20, and become blocked under the head 11 in order to prevent the stopper 10 from being pulled out of the cage 20.

Owing to these first tabs 23, the stopper 10 remains secured to the cap 100 and the stopper 10 and cap 100 cannot become accidentally separated, in particular, when the cap 100 is in its intermediate holding position on the container 200.

The cage 20 advantageously comprises a plurality of second tabs 24, each being supported by a second bridge 26. Each second tab 24 is flexible and is inclined relative to the branches 22 toward the inside of the cage 20, at an angle of between 20° and 60°, advantageously around 30°, in the direction of the upper ring 21. These second tabs 24 are intended to remain above the collar 202, to be slightly raised or to be in contact therewith, when the cap 100 is in the intermediate holding position (FIG. 1A). In this intermediate holding position, the second bridges 26 and the branches 22 are intended to surround the collar 202 at least in part. This configuration allows the stopper 10/cap 100 assembly to be more stably and securely mechanically held during potential lyophilization steps.

Furthermore, the second tabs 24 are intended to bear under the collar 202 of the neck 201 of the container 200 when the cap 100 is in the locking position (FIG. 1B). In fact, when passing into the locked position, the stopper 10/cap 100 assembly will descend into/around the neck 201 of the container 200 so as to completely press the foot 12 of the stopper 10 into the neck 201 until the head 11 thereof is resting on the collar 202. While being pressed in, the second tabs 24 flex and move aside to allow the collar 202 to pass, and become blocked under the collar, thus locking the stopper 10 on the container 200. It should be noted that, in the locked position, the first tabs 23 move aside because they are bearing against the peripheral edge of the collar 202. They therefore do not remain under the head 11 of the stopper 10 and let the head bear against the collar 202. The first bridges 25 then surround the peripheral edge of the collar 202.

The cage 20 comprises at least one flexible member 27, one end of which is rigidly connected to a bridge 25, 26 and another free end of which is oriented toward the upper ring 21. The flexible member 27 is able to flex toward the outside of the cage 20. In the examples shown, it is rigidly connected to a second bridge 26, but this configuration is not limiting; it is quite possible for the flexible member 27 to be supported by a first bridge 25.

The flexible member 27 is further adjacent to a weak point 28 provided in the bridge 25, 26 supporting the flexible member 27. The weak point 28 may correspond to a notch (FIG. 3A) or to a partial or total slot (FIG. 3B), arranged on the bridge 25, 26. This weak point 28 constitutes a preferred breaking point when a force is applied to the bridge 25, 26, in particular, via the flexible member 27.

According to the present disclosure, the flexible member 27 of the cage 20 is rigidly connected to the breakable strip 35 of the outer body 30 at a second fixing zone F2 (FIG. 2B).

In order to perform this attachment, the elements to be rigidly connected, namely the flexible member 27 and the outer body 30, may comprise mechanical retaining means able to cooperate to form the second fixing zone F2. For example, the mechanical retaining means may consist of a flange, a shoulder 271 (arranged on the flexible member 27 to cooperate with a complementary recess in the outer body 30) or a dovetail system, obtained by forming the flexible member 27 and the outer body 30 by an overmolding technique.

As stated in reference to the first fixing zone F1, the second fixing zone F2 may involve chemical adhesion between the materials of the elements to be rigidly connected. For example, the flexible member 27 and the outer body 30 can be formed by an overmolding technique, from the same or different plastic materials, but able to adhere to one another.

These two options (mechanical and chemical) for rigidly connecting the flexible member 27 and the outer body 30 may of course be implemented together to form the second fixing zone F2.

Advantageously, the second fixing zone F2 is located, in altitude along the main axis z, between the upper face 30*a* of the outer body 30 and half the height of the cylindrical wall 30*b* of the outer body 30, which leads to the advantages of a lever arm during the process of fully removing the locking cap 100. Of course, the second fixing zone F2 may alternatively be located at any altitude between the bridge 25, 26 supporting the flexible member 27 and the upper ring 21.

The locking cap 100 according to the present disclosure is completely removable and therefore allows the stopper 10 to be withdrawn with a view to completely opening the container 200.

In practice, when someone wants to access the contents of the container 200, an edge of the capsule 40 is raised in order to grasp it and exert a tearing force. Advantageously, as shown, in particular, in FIG. 2B and FIG. 4A, a local gripping zone 43 is defined by the mutual shape of the capsule 40 and the outer body 30 in a peripheral part of the cap 100. This force is transmitted from the capsule 40 to the breakable strip 35, these two elements being rigidly connected (FIG. 4B). If the tearing force is sufficient, it will induce a break between the breakable strip 35 and the rest of the outer body 30 (for example, at the double groove of reduced thickness) over the entire extent of the breakable strip 35 (FIG. 4C). The outer body 30 is then open, the breakable strip 35 being completely separated from the rest of the outer body 30. Thus, the rest of the outer body 30 can easily be separated from the other elements of the locking cap 100 (capsule 40, breakable strip 35 and cage 20) and of the container 200.

Advantageously, a hinge or flexible hinge zone 32 can be arranged in the cylindrical wall 30*b* of the outer body 30, in a region diametrically opposite the cylindrical wall portion 30*b* corresponding to the breakable strip 35; this facilitates the separation into two parts of the outer body 30 and consequently its separation from the container 200.

Figure 4D:
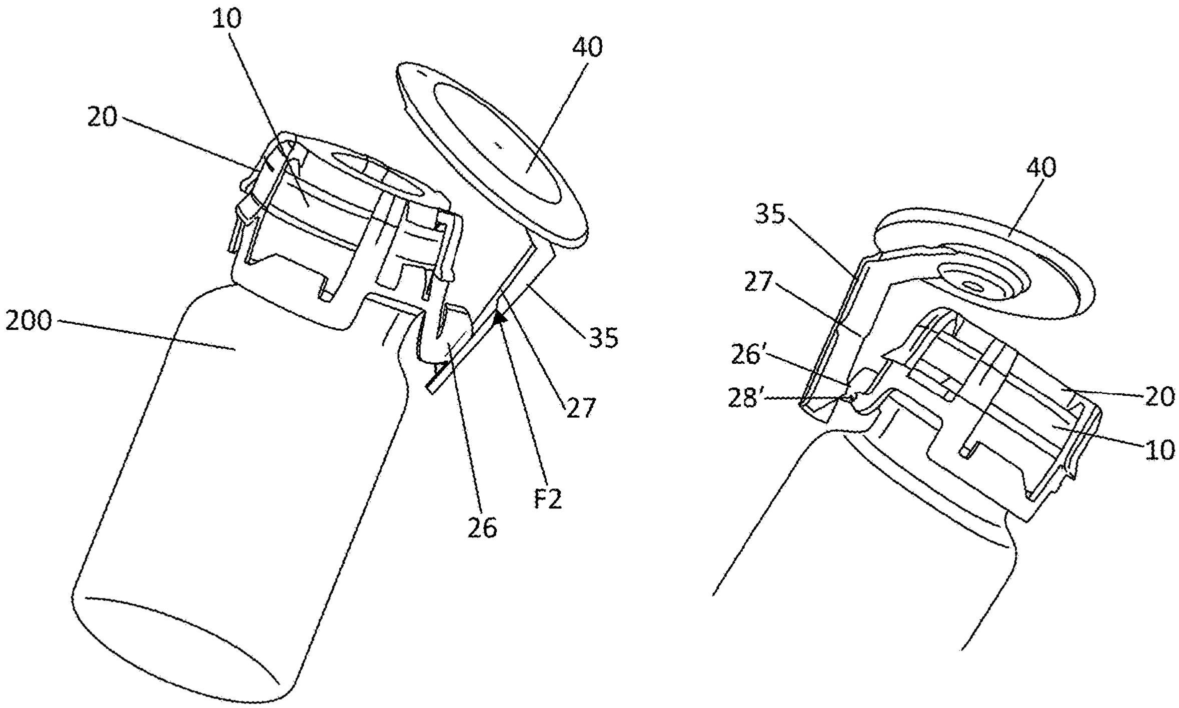

The capsule 40 and the breakable strip 35 remain rigidly connected to the flexible member 27 of the cage 20, at the second fixing point F2 (FIG. 4D). Continuing the application of a force to the capsule 40/flexible member 27, oriented toward the outside of the cage 20, transmits a tearing stress at the weak point 28 of the bridge 25, 26 supporting the flexible member 27. If the weak point 28 is a notch or a partial slot, the force applied causes the breaking 28' of the bridge 25, 26 in the extension of the notch or partial slot, and the deformation of the broken bridge 26' toward the outside of the cage 20. If the weak point 28 is a total slot, the force applied induces the deformation of the bridge 26' and its separation toward the outside of the cage 20.

Figure 4E:
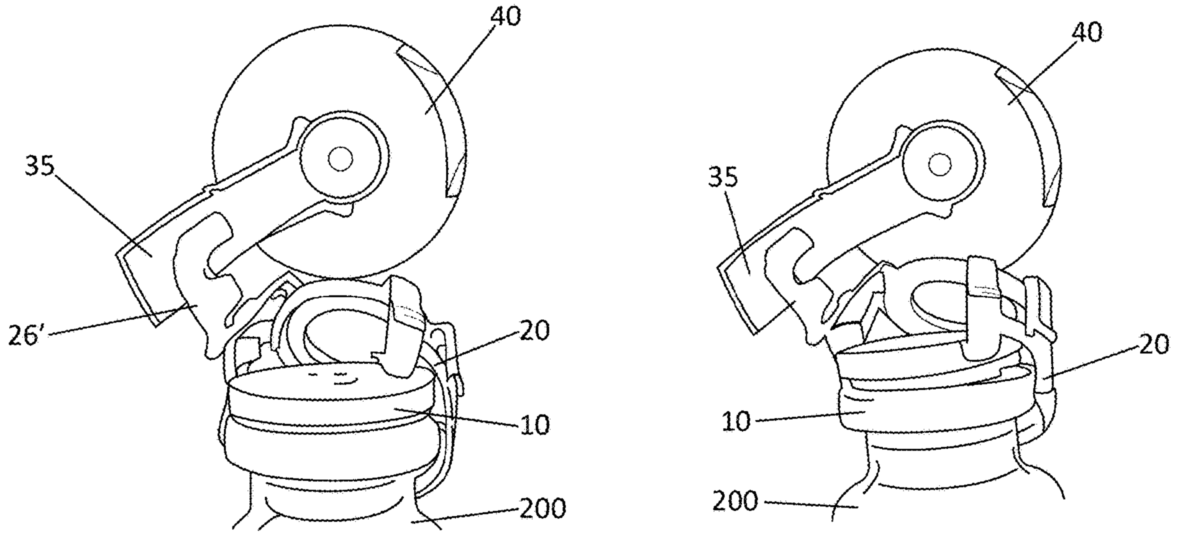

In all cases, the cage 20 can then be easily detached from the neck 201 of the container 200, leaving free access to the stopper 10 (FIG. 4E), which may in turn be removed to access the pharmaceutical product.

Owing to the features of the locking cap 100 according to the present disclosure, it is easy to remove it from the container 200 when the stopper 10 is to be opened to access the pharmaceutical product. The gripping of the capsule 40 is simple and ergonomic, and the fact that this capsule 40 is not only rigidly connected to the breakable strip 35 of the outer body 30 but also to the flexible member 27 of the cage 20 facilitates the successive separation of the outer body 30 and the cage 20. The gripping of the capsule 40, then potentially of the capsule 40 and the breakable strip 35, is practical and well suited to operators wearing gloves, since the gripping surface is relatively large, compared to a flexible member 27 taken in isolation. The application of a force and the reproducibility thereof are facilitated by these gripping ergonomics.

The various elements forming the cap 100 according to the present disclosure (cage 20, outer body 30, capsule 40) are preferentially made by molding plastics materials compatible with the targeted medical applications and other sterilization constraints.

As mentioned above, these three elements can advantageously be manufactured during one or several overmolding steps, to mold them and rigidly connect them directly to one another at the first fixing zone F1 and the second fixing zone F2. By way of example, the capsule 40 can be overmolded onto the outer body 30, then the outer body 30/capsule 40 assembly can be overmolded on the cage 20. Of course, the overmolding steps could also be carried out in another order, by any method known from the prior art.

The cage 20, the outer body 30 and the capsule 40 may be made of materials such as polycarbonate (PC), polypropylene (PP) or polybutylene terephthalate (PBT). Advantageously, the capsule 40 may be formed from flexible plastics materials, such as polypropylene (PP), in order to make it easier to grasp. It is also possible to choose to develop the outer body 30 from two different materials: a first material to form the breakable strip 35, the first material also being able to be chosen to form the capsule 40; and a second material, which is optionally more rigid, to form the rest of the outer body 30. As an example, the first material may be polypropylene, and the second material may be polybutylene terephthalate.

Naturally, the present disclosure is not limited to the embodiments and examples that have been described, and it is possible to add alternative embodiments thereto without departing from the scope of the invention as defined by the claims.

What is claimed is:

1. A locking cap for a container comprising a neck, the locking cap configured to block a stopper in the neck of the container, the locking cap comprising:

an outer body defined by an upper face and a cylindrical wall centered on a main axis, the outer body having a breakable strip extending from the upper face to a free end of the cylindrical wall;

a capsule arranged on the upper face and rigidly connected to the breakable strip; and a cage locked in the outer body, and configured to surround a collar of the neck of the container in a locking position of the cap, the cage comprising an upper ring, against which the stopper is intended to bear when the stopper is arranged in the cage, a plurality of branches connected to the upper ring and defining therewith a generally cylindrical shape of the cage, a plurality of bridges, each interconnecting two adjacent branches, and a flexible member, one end of which is rigidly connected to a bridge of the plurality of bridges and a free end of which is oriented toward the upper ring, the flexible member being adjacent to a weak point of the bridge, the flexible member of the cage being rigidly connected to the breakable strip of the outer body.

2. The locking cap of claim 1, wherein the weak point comprises a notch or a slot on the bridge supporting the flexible member.

3. The locking cap of claim 2, wherein:

the capsule is rigidly connected to the breakable strip at a first fixing zone; and the flexible member is rigidly connected to the breakable strip at a second fixing zone.

4. The locking cap of claim 3, wherein the second fixing zone is located, in height along the main axis, between the upper face of the outer body and half the height of the cylindrical wall of the outer body.

5. The locking cap of claim 3, wherein:

the first fixing zone involves chemical adhesion between a material of the capsule and a material of the breakable strip; and/or the second fixing zone involves chemical adhesion between a material of the flexible member and the material of the breakable strip.

6. The locking cap of claim 3, wherein:

the first fixing zone comprises a flange, a shoulder, or a dovetail system; and/or the second fixing zone comprises a flange, a shoulder, or a dovetail system.

7. The locking cap of claim 6, wherein the second fixing zone is located, in height along the main axis, between the upper face of the outer body and half the height of the cylindrical wall of the outer body.

8. The locking cap of claim 7, wherein:

the outer body comprises a first material and a second material, the first material forming the breakable strip and the second material forming a remainder of the outer body; and the capsule comprises the first material.

9. The locking cap of claim 8, wherein the capsule comprises polypropylene.

10. The locking cap of claim 9, wherein the outer body comprises at least one material selected from among the group consisting of polypropylene and polybutylene terephthalate.

11. The locking cap of claim 10, wherein the cage comprises polycarbonate.

12. The locking cap of claim 1, wherein:

the capsule is rigidly connected to the breakable strip at a first fixing zone; and the flexible member is rigidly connected to the breakable strip at a second fixing zone.

13. The locking cap of claim 1, wherein:

the capsule is chemically adhered to the breakable strip; and/or the flexible member is chemically adhered to the breakable strip.

14. The locking cap of claim 1, wherein:

the capsule is connected to the breakable strip by a flange, a shoulder, or a dovetail system; and/or the flexible member is connected to the breakable strip by a flange, a shoulder, or a dovetail system.

15. The locking cap of claim 1, wherein:

the outer body comprises a first material and a second material, the first material forming the breakable strip and the second material forming a remainder of the outer body; and the capsule comprises the first material.

16. The locking cap of claim 1, wherein the capsule comprises polypropylene.

17. The locking cap of claim 1, wherein the outer body comprises at least one material selected from among the group consisting of polypropylene and polybutylene terephthalate.

18. The locking cap of claim 1, wherein the cage comprises polycarbonate.

19. A method for manufacturing a locking cap for a container comprising a neck, the locking cap configured to block a stopper in the neck of the container, the locking cap including:

an outer body defined by an upper face and a cylindrical wall centered on a main axis, the outer body having a breakable strip extending from the upper face to a free end of the cylindrical wall;

a capsule arranged on the upper face and rigidly connected to the breakable strip; and a cage locked in the outer body, and configured to surround a collar of the neck of the container in a locking position of the cap, the cage comprising an upper ring, against which the stopper is intended to bear when the stopper is arranged in the cage, a plurality of branches connected to the upper ring and defining therewith a generally cylindrical shape of the cage, a plurality of bridges, each interconnecting two adjacent branches, and a flexible member, one end of which is rigidly connected to a bridge of the plurality of bridges and a free end of which is oriented toward the upper ring, the flexible member being adjacent to a weak point of the bridge, the flexible member of the cage being rigidly connected to the breakable strip of the outer body;

the method comprising at least one overmolding step for molding and joining together:

the capsule and the outer body; and the outer body and the cage.

20. The method of claim 19, wherein the method comprises a single overmolding step for molding and joining together the capsule, the outer body, and the cage.

* * * * *